Figure 1:
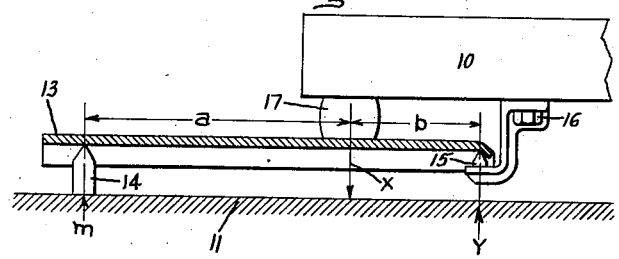

Oct. 21, 1941.    E. H. HULL    2,260,029

FLEXIBLE SUPPORTING ARRANGEMENT

Filed Dec. 16, 1939

Inventor:
Edwin H. Hull,
by Harry E. Dunham
His Attorney.

Patented Oct. 21, 1941

2,260,029

UNITED STATES PATENT OFFICE 2,260,029

FLEXIBLE SUPPORTING ARRANGEMENT

Edwin H. Hull, Schenectady, N. Y., assignor to General Electric Company, a corporation of New York Application December 16, 1939, Serial No. 309,647

5 Claims. (Cl. 248—22)

The present invention relates to flexible supporting arrangements for supporting a machine, apparatus or the like on a foundation and to prevent or reduce the transmission of vibration of the machine, that is, the supported body, through the support to the foundation or the supporting body and, vice versa, to prevent the transmission of vibration of the supporting body to the supported body. More specifically the invention relates to the type of supporting arrangements which includes compressed cushions of rubber or like flexible material between the supporting body and the supported body. Difficulties are experienced in providing arrangements including compressed cushions of rubber or the like for supporting bodies of relatively light weight whenever it becomes necessary to prevent the transmission of vibration of low frequency through such cushions under compression. For example, if it is desired to reduce the transmission of vibration of frequencies of the order of 10 cycles per second or less by means of compressed rubber cushions, the horizontal cross section through such cushions becomes small relative to the height of the cushions. The cushions then assume the shape of columns, but columns of rubber or the like supporting a body do not constitute a stable support. They are unstable in horizontal direction.

The object of my invention is to provide an improved construction and arrangement of supports by means of compressed cushions of rubber or like flexible material which are stable and prevent or reduce the transmission of low frequency vibration between the supported body and the supporting body. This is accomplished in accordance with my invention by the provision of supporting devices each including a lever with a plurality of pivots of which at least one pivot is formed by a compressed cushion of rubber or like flexible material loaded by a force corresponding to a multiple of the mass of the body to be supported. In a preferred embodiment such lever has end portions pivotally engaging the supporting member and the supported member respectively and an intermediate point pivotally engaging one of the members. At least the pivotal engagement between the intermediate point of the lever and one of the members is formed by a compressed cushion. Preferably, however, all pivotal connections or engagements between the lever and said members are formed by compressed cushions of rubber or the like.

For a better understanding of what I believe to be novel and my invention, attention is directed to the following description and the claims appended thereto in connection with the accompanying drawing.

Figure 2:
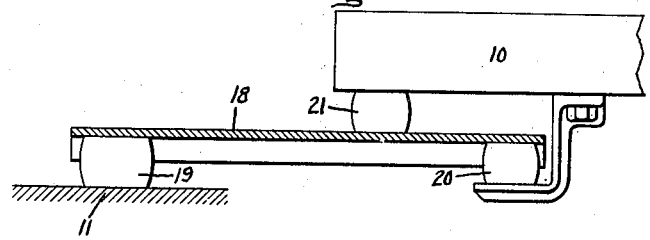
Figure 3:
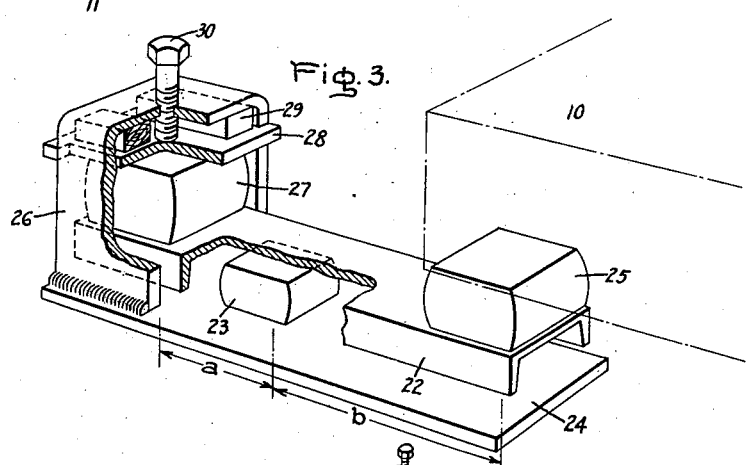

In the drawing Fig. 1 illustrates a supporting device embodying my invention; Fig. 2 is a modification of my invention; Fig. 3 illustrates a perspective view of another modification of a supporting device in accordance with my invention; and Fig. 4 shows a perspective view of a supporting arrangement by means of devices as shown in Fig. 3.

Figure 4:
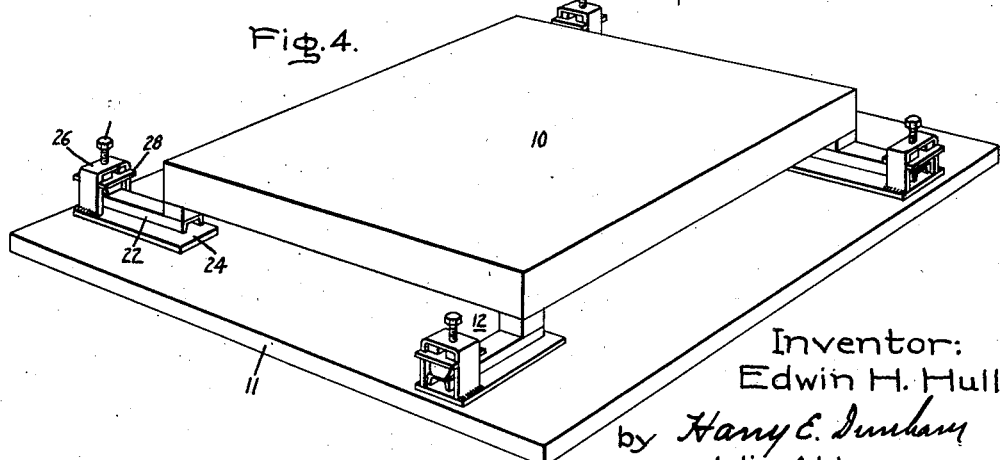

As best shown in Fig. 4, a body 10 is supported on a foundation 11 in accordance with my invention by means of a plurality of supporting devices 12. In the present instance I have shown four such devices, each engaging a corner of the square-shaped body 10. Figs. 1, 2 and 3 show several modifications of such supporting devices. In each of these figures, a body 10 is supported on a foundation 11.

The arrangement of Fig. 1 comprises a lever 13 which has a left-hand end portion engaging a rigid pivot 14 on the foundation 11 and a right-hand end portion engaging a rigid pivot 15 secured to the body 10 by a bolt 16. Another pivot 17 in the form of a compressed cushion of rubber or like flexible material is provided between an intermediate point of the lever 13 and a corner of the body 10. With this arrangement a force is transmitted through the cushion 17 which is greater than the force corresponding to the mass of the body to be supported. To make this clearer, let us assume that the body 10 of Fig. 4 has a mass $4m$. As the arrangement includes four devices uniformly supporting the four corners, each of said devices has to support a mass $m$. If the body 10 were supported in the conventional way by means of four cushions, one under each corner of the body, then a force $m$ would be transmitted through each of these cushions. From another viewpoint, each cushion would be subject to compression by a force $m$. The natural frequency of vibration in vertical direction through such supporting cushions is a function of the deflection to which such cushions are subjected. More specifically, this frequency of vibration is inversely proportional to the square root of the deflection. Hence, the greater the deflection, the smaller the frequency of vibration. As stated above, the deflection of such cushions under compression may be increased either by reducing their horizontal cross section or increasing their height. This measure, however, renders the cushion 10 unstable in horizontal direction. According to my invention the deflection of the cushions is increased by increasing the force thereon.

In the arrangement of Fig. 1, the force acting on the pivot 14 is equal to $m$, that is, equal to the mass to be supported, disregarding the weight of the lever 13. If we designate the force acting on the cushion 17 with $x$, the force acting on the right-hand end of the lever with $y$, and the distances between pivot 17 and pivots 14 and 15 with $a$ and $b$ respectively, then we have the following two equations for the system in equilibrium.

1. $xa = y(a+b)$
2. $x - y = m$

From this follows:

$$x = m\frac{a+b}{b}$$

for an arrangement in which $a$ equals $2b$ we have $x = 3m$. In other words, with reference to the arrangement of Fig. 1, the cushion 17 is subject to deflection caused by a force $x$ which is proportional to three times the mass $m$ of the body to be supported on the device. This increased force causing increased deflection reduces the natural frequency of vibration. Thus, according to my invention, the pivot or supporting cushion 17 is subject to increased deflection by means of the lever 13 which latter has at least one pivotal support on the foundation and one on the body 10. The cushion 17 in the present instance forms a pivotal support between an intermediate point of the lever and the body.

In the arrangement of Fig. 2 the body 10 is supported on the foundation 11 by a device including a lever 18 corresponding to the lever 13 of Fig. 1 and three pivots 19, 20 and 21 corresponding to the pivots 14, 15 and 17 respectively of Fig. 1. The pivots 19, 20 and 21 are all in the form of cushions under compression, that is, the arrangement of Fig. 2 is the same as that of Fig. 1 except that compressed cushions of rubber or like flexible material are substituted for the rigid pivots 14 and 15 of Fig. 1.

The arrangement of Fig. 3 which is one of the four devices used in Fig. 4 comprises a lever 22 which has an intermediate point or portion supported on a cushion 23 resting on a foundation or base plate 24. The lever 22 is U-shaped in cross-section, similar to those of Figs. 1 and 2. The body 10 indicated in dash-dotted lines engages a pivot or cushion 25 on the right-hand end portion of the lever 22. The left-hand end portion of the lever 22 is pivoted to the foundation by means including an inverted U strap 26 having legs welded to the base plate 24 and means including a compressed cushion 27 of rubber or the like between the U strap and the left-hand end of the lever 22. Engagement between the cushion 27 and the U strap 26 is effected by a plate 28 engaging the upper surface of the cushion 27 and guided on the strap 26 and wood shims 29 between the plate 28 and the base of the U strap. The provision of wood shims 29 permits ready adjustment of the lever 22 by replacing the shims 29 with others of different thickness. Removal of the shims 29 is facilitated by the provision of a jack bolt 30. Thus, if it is desired to put in thicker shims 29 in order to force downward the left-hand end of the lever 22, all that is necessary is to tighten the jack bolt 30, replace the shims 29 by thicker ones, and subsequently loosen the jack bolt 30. In the arrangement of Fig. 3 the force acting on the cushion 23 is proportional to the mass of the body 10 to be supported by the device times the ratio $$\frac{a+b}{b}$$

$a$ representing the distance between the cushions or pivots 23 and 27 and $b$ the distance between the cushions 23 and 25. The increased force on the cushion 23 causes increased deflection of this cushion as compared with a similar cushion directly supporting the body 10, that is, without the lever 22. From a consideration of the drawing it can be readily seen that the increased deflection of the cushion 23 is further increased with regard to the right-hand end of the lever 22 and that this additional increase is again proportional to the above ratio $$\frac{a+b}{b}$$

Thus, the provision of the lever 22 has a twofold function; first, it increases the force and consequently the deflection on the cushion 23 in proportion to the above lever ratio and second, it multiplies this increased deflection again in proportion to the lever ratio. Similar considerations apply with regard to the arrangements shown and described in connection with Figs. 1 and 2.

A comparison between the arrangements of Figs. 3 and 2 shows that whereas in Fig. 2 the cushion 21 forms a pivot between the body 10 and the lever 18, the corresponding cushion 23 of Fig. 3 forms a pivot between the lever 22 and the foundation or base plate 24. Also, the cushion 19 of Fig. 2 corresponds to the cushion 25 of Fig. 3 and the cushion 27 of Fig. 3 which is strapped to the base plate corresponds to the cushion 20 of Fig. 2, the cushion 20 being strapped to the body. From another viewpoint, the arrangements of Figs. 2 and 3 are basically the same, the only difference between them being that the supported body 10 and the supporting body or foundation 11 have changed their functions as regards the transmission of forces through the several pivots or cushions in the two figures. In each case we have a supporting member 11 and a supported member 10 pivotally connected together or engaging each other by a device including a lever and at least one pivot in the form of a cushion under compression between such lever and one of the members. This cushion under compression is subject to a force greater than the mass to be supported by the device. Thus, a body or a portion thereof is supported in accordance with my invention by means comprising a cushion and a lever mechanism engaging the cushion and the body and subjecting the cushion to deflections greater than would be obtained with the cushion alone as a support.

Where a body is supported by a plurality of devices embodying my invention, as is the case in the arrangement of Fig. 4, it is generally desirable to arrange the devices so that the horizontal stiffness is the same in all directions. The horizontal stiffness of each device in a direction parallel to its lever is different from the horizontal stiffness of such device in a direction perpendicular to that of its lever. In the arrangement of Fig. 4 it will be noted that each device supports a corner of the square-shaped body and that the direction of the lever of each device forms an angle alpha with the diagonal through the supported corner. More generally speaking, the relation of each device and a line through the supporting point and the center of gravity of the body is the same for all devices thereby assuring uniform horizontal stiffness of the support in all directions.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. Flexible supporting arrangement comprising a supported member, a supporting member, and horizontally and vertically flexible means supporting the supported member on the supporting member, said means comprising a lever, spaced compressed cushions of rubber-like material for pivotally connecting the lever to each member, and another cushion of flexible rubber-like material between the lever and one of the members and subject to a deflecting force greater than that exerted by the corresponding mass of the supported member, there being no path between the supported and the supporting members which does not include at least one of said cushions.

2. Supporting arrangement comprising a foundation, a body, and horizontally and vertically flexible means supporting the body on the foundation comprising a lever, cushions of rubber-like flexible material subject to compression for supporting end portions of the lever on the body and on the foundation respectively, and another cushion of rubber-like material subject to compression between the body and an intermediate point of the lever, each path between the body and the foundation including at least one of said cushions.

3. A supporting device comprising a base plate, a lever, a cushion of rubber-like material subject to compression between an intermediate point of the lever and the base plate, means including an inverted U strap with legs secured to the base plate and a flexible cushion for transmitting forces from one end of the lever to the base plate, and a flexible cushion on the other end of the lever for compression by a body to be supported.

4. Supporting arrangement comprising a body, a foundation, and a plurality of device supporting separate points of the body on the foundation, each device including a lever and cushions of rubber-like material under compression engaging spaced portions of the lever, one of said cushions being subject to a compression force greater than that exerted by the corresponding mass supported by the individual device whereby such force increases the deflection of the cushion and thereby reduces the transmission of low frequency vibration through the cushion, each path between the body and the foundation through the devices including one of said cushions.

5. Arrangement for supporting a body member on a foundation member and to reduce transmission of low frequency vibration between such members comprising a plurality of devices each having a lever and compressed cushions of rubber-like material for pivotally supporting the ends of the lever on such body member and on such foundation member respectively, and another compressed cushion of rubber-like material forming a pivot between an intermediate point of the lever and one of said members, the angles defined between each lever and a line through the end of such lever and the center of gravity of such body being equal for all devices to assure uniform horizontal stiffness of the support in all directions, each path between the body and the foundation through the devices including one of said cushions.

EDWIN H. HULL.